US012158025B2

(12) United States Patent
Wang

(10) Patent No.: US 12,158,025 B2
(45) Date of Patent: Dec. 3, 2024

(54) OPENING AND CLOSING DEVICE

(71) Applicant: SINOX CO., LTD, New Taipei (TW)

(72) Inventor: Chih-Lun Wang, New Taipei (TW)

(73) Assignee: SINOX CO., LTD, New Taipei (TW)

( * ) Notice: Subject to any disclaimer, the term of this patent is extended or adjusted under 35 U.S.C. 154(b) by 427 days.

(21) Appl. No.: 17/570,665

(22) Filed: Jan. 7, 2022

(65) Prior Publication Data

US 2022/0235584 A1 Jul. 28, 2022

(30) Foreign Application Priority Data

Jan. 22, 2021 (TW) ................................ 110200867

(51) Int. Cl.

*E05B 65/52* (2006.01)
*E05B 37/00* (2006.01)
*E05B 37/02* (2006.01)

(52) U.S. Cl.

CPC ...... *E05B 65/5269* (2013.01); *E05B 37/0034* (2013.01); *E05B 37/02* (2013.01)

(58) Field of Classification Search

CPC .. E05B 65/52; E05B 65/5269; E05B 37/0034; E05B 37/02
USPC ...................................................... 70/69, 312
See application file for complete search history.

(56) References Cited

U.S. PATENT DOCUMENTS 7,331,204 B1 * 2/2008 Hsieh .................... E05B 35/105 70/69
8,919,158 B2 * 12/2014 Visenzi ...................... B62J 9/24 224/418

FOREIGN PATENT DOCUMENTS

EP 2186715 A1 * 5/2010 ................ B62J 9/00
WO WO-2009101470 A1 * 8/2009 ................ B62J 9/00

* cited by examiner

*Primary Examiner* — Suzanne L Barrett
(74) *Attorney, Agent, or Firm* — Birch, Stewart, Kolasch & Birch, LLP

(57) ABSTRACT

An opening and closing device is provided, including a fixing device and a limiting device. The fixing device includes a fixing portion and a fixing member, and the limiting device includes a driving device, a limiting portion, and a limiting member. The fixing member may rotate to be engaged with the fixing portion. The driving device is disposed on a first shell. The limiting portion is disposed on an inner side of the first shell. The limiting member is disposed on an inner side of a second shell. When the first shell approaches the second shell, the limiting member end portion may be engaged with the limiting portion. The driving device may be subjected to an external force to release the engagement between the fixing member and the fixing portion and the engagement between the limiting member end portion and the limiting portion.

10 Claims, 14 Drawing Sheets

OPENING AND CLOSING DEVICE

TECHNICAL FIELD

The present utility model relates to an opening and closing device. Further, the present utility model relates to an opening and closing device used with a first shell and a second shell.

BACKGROUND

For a long time, locks have been widely used on a variety of devices and objects that need to be secured. For objects such as a cabinet, a suitcase, a travel bag, and an electronic device, a padlock is used to prevent objects from being opened and taken by others. Passengers usually lock their suitcases to avoid theft during air, sea, or land journeys.

However, a suitcase is prone to be accidentally opened during travel due to collision and other factors, causing objects in the suitcase to be scattered or lost. Therefore, straps and film bindings are additionally used to reinforce the suitcase, or a cloth cover is additionally used to cover the suitcase. The above method is relatively inconvenient in use.

On the other hand, the common suitcase lock is set at a position where sides of two shells are adjacent to the other shell. To lock the suitcase, the two shells need to be approached together, and a zipper or a lock hook is inserted into a lock hole while an approached state is maintained. When the suitcase is loaded with more or bulky objects, the above operation is inconvenient.

SUMMARY

An objective of the present utility model is to provide an opening and closing device, which can reduce accidental opening of a box body and resolve the above problem in the related art.

The opening and closing device of the present utility model is used with a first shell and a second shell of a box body that are approachable with each other. The opening and closing device includes a fixing device and a limiting device. The fixing device includes a fixing portion and a fixing member, and the limiting device includes a driving device, a limiting portion, and a limiting member. The fixing portion is disposed on the first shell, and is provided with a fixing hole. One end of the fixing member is pivotally connected to an outer side of the second shell, and when the first shell approaches the second shell, the fixing member may rotate so that the other end is inserted into the fixing hole to be engaged with the fixing portion. The driving device is disposed on the first shell. The limiting portion is disposed on an inner side of the first shell. The limiting member is disposed on an inner side of the second shell, one end of the limiting member is provided with a limiting member end portion, and when the first shell approaches the second shell, the limiting member end portion may be engaged with the limiting portion. The driving device may be subjected to an external force to release the engagement between the fixing member and the fixing portion and the engagement between the limiting member end portion and the limiting portion.

In an embodiment of the present utility model, the opening and closing device further includes a lock body for limiting movement of the driving device.

In an embodiment of the present utility model, the lock body is disposed on the fixing portion.

In an embodiment of the present utility model, the fixing portion further includes an arc-shaped guide slot and an arc-shaped hook that is movably disposed in the arc-shaped guide slot; when the other end of the fixing member is inserted into the fixing hole, the arc-shaped hook may move so that one end of the arc-shaped hook extends into the fixing hole to be engaged with the other end of the fixing member; and the driving device may be pushed by the external force so that the arc-shaped hook moves and leaves the fixing hole, to release the engagement between the one end of the arc-shaped hook and the other end of the fixing member.

In an embodiment of the present utility model, the first shell may approach the second shell to form an approaching boundary, and the driving device may be subjected to the external force to move along the approaching boundary to release the engagement between the limiting member end portion and the limiting portion.

In an embodiment of the present utility model, the driving device is inserted to the first shell, and includes a manual member and a driving member. The manual member is disposed on the outer side of the first shell. The driving member is connected to the manual member, and is disposed on the inner side of the first shell.

In an embodiment of the present utility model, the limiting member end portion extends toward the first shell along an X axis, and the manual member may be subjected to the external force so that the driving member moves along a Y axis to abut against the limiting member end portion, so that the limiting member end portion generates displacement along a Z axis to release the engagement between the limiting member end portion and the limiting portion. The X axis, the Y axis, and the Z axis are orthogonal.

In an embodiment of the present utility model, a top end of the limiting member end portion extends toward the first shell along the X axis to form a driving portion, and the manual member may be subjected to the external force so that the driving member moves along the Y axis to abut against the driving portion.

In an embodiment of the present utility model, the opening and closing device further includes a release device disposed on the first shell, for releasing the engagement between the fixing member and the fixing portion and the engagement between the limiting member end portion and the limiting portion.

In an embodiment of the present utility model, the driving member includes a first moving member connected to the manual member and a second moving member abutting against the first moving member, the manual member may be subjected to the external force so that the first moving member moves to drive the second moving member, the release device includes a rotating member, and the rotating member may rotate to push the second moving member.

DETAILED DESCRIPTION

Figure 1A:
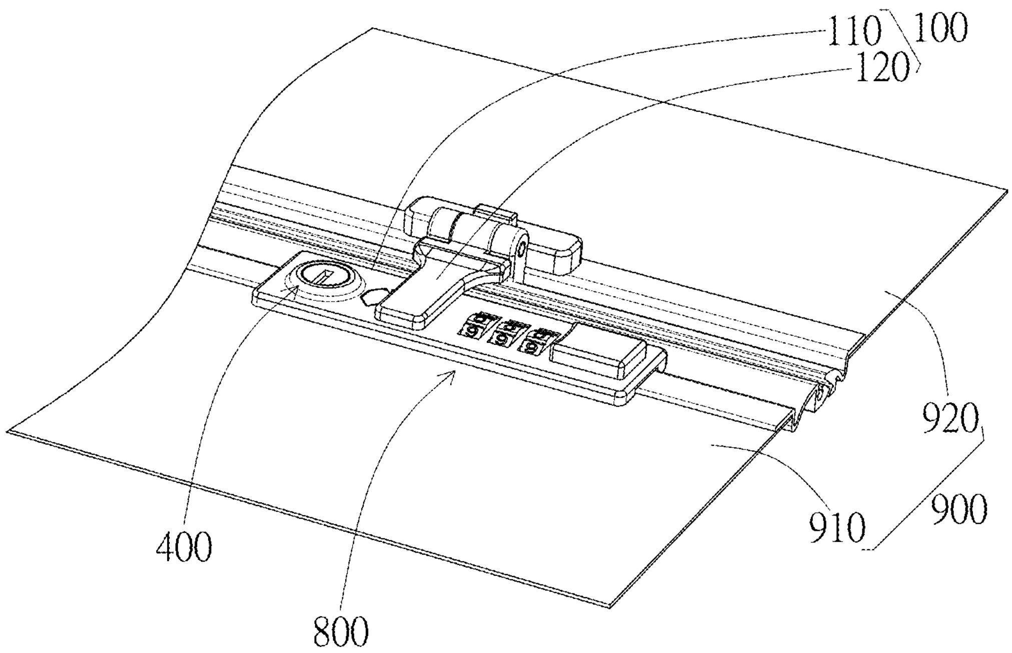
FIG. 1A and FIG. 1B are schematic diagrams of an embodiment of an opening and closing device of the present utility model.
Figure 1B:
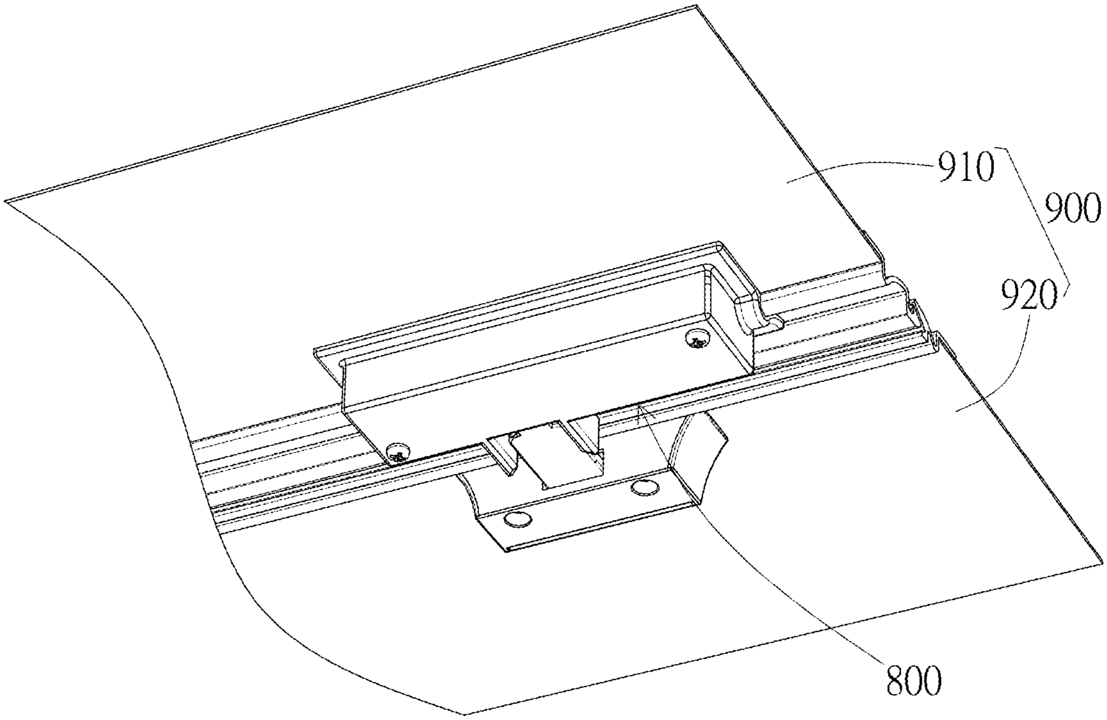

FIG. 1A and FIG. 1B are three-dimensional views of an embodiment of the present utility model. As shown in FIG. 1A and FIG. 1B, an opening and closing device 800 of the present utility model is used with a first shell 910 and a second shell 920 that are approachable with each other. The first shell 910 and the second shell 920 may be components of a box body 900, and the box body 900 is a suitcase provided with the first shell 910 and the second shell 920 that may be opened and closed with a connected side as a shaft. However, in different embodiments, the box body 900 may be a luggage or briefcase, etc., and is not limited to be formed by two shells connected by a side.

Figure 2A:
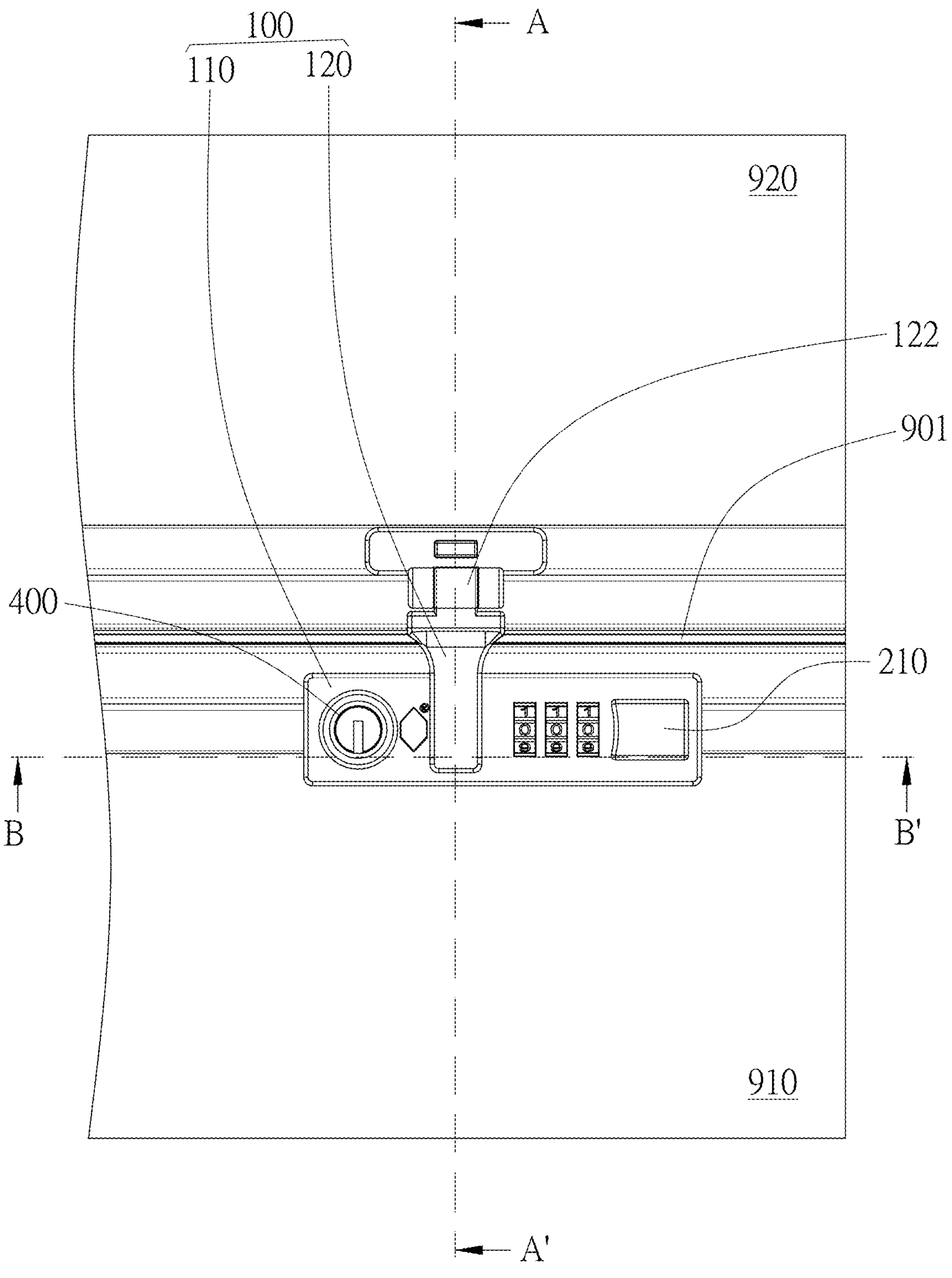
FIG. 2A is a schematic top view of the embodiment of the opening and closing device of the present utility model.
Figure 2B:
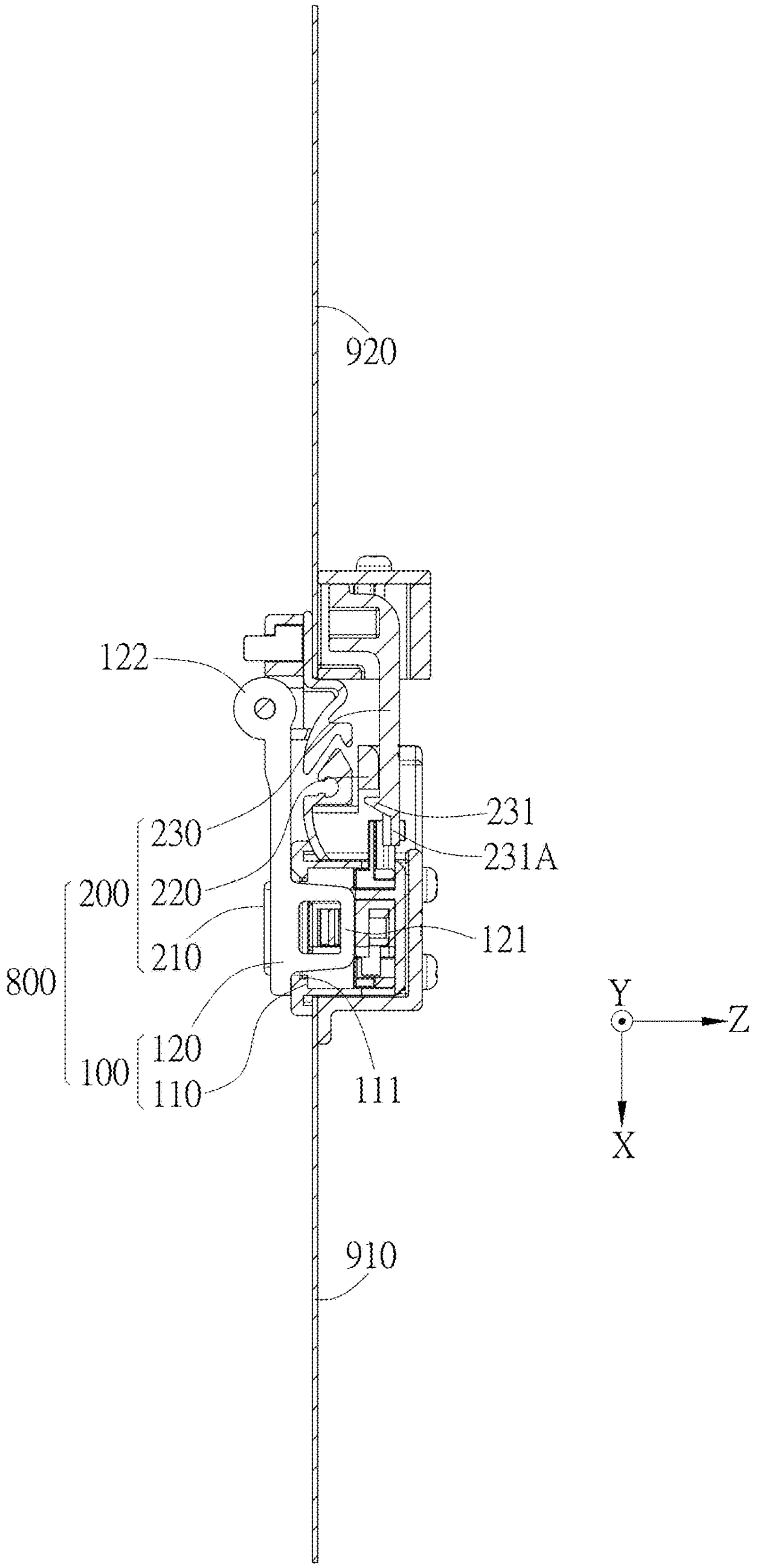
FIG. 2B and FIG. 2C are schematic cross-sectional views of the embodiment of the opening and closing device of the present utility model.
Figure 2C:
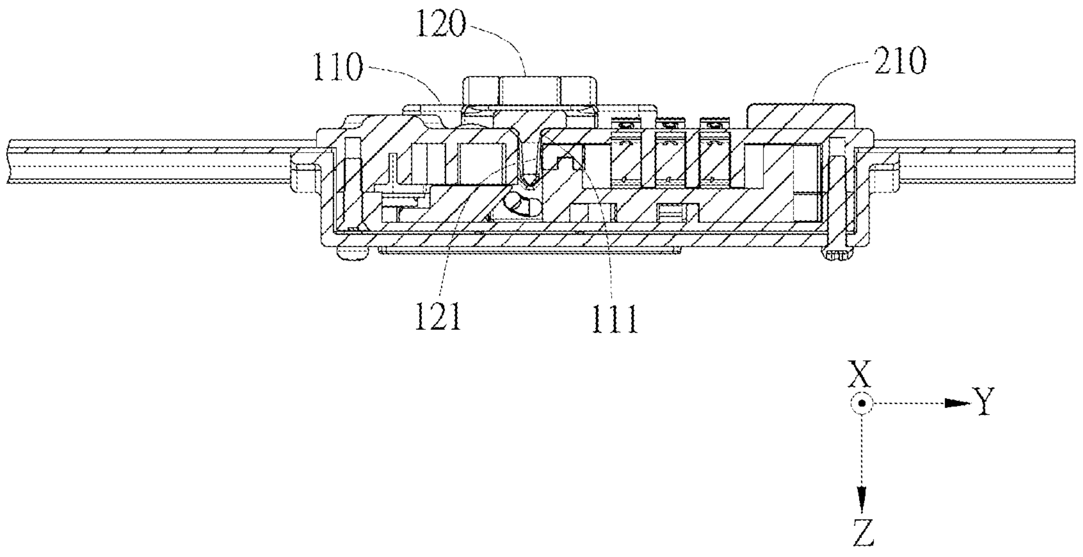

FIG. 2A is a top view of an embodiment of the present utility model, and FIG. 2B is equivalent to a cross-sectional view of a cut surface taken along a dash-dot line A-A' shown in FIG. 2A. FIG. 2C is equivalent to a cross-sectional view of a cut surface taken along a dash-dot line B-B' shown in FIG. 2A. As shown in FIG. 2B, the opening and closing device 800 includes a fixing device 100 and a limiting device 200. In the embodiment shown in FIG. 2B and FIG. 2C, the fixing device 100 includes a fixing portion 110 and a fixing member 120, and the limiting device 200 includes a driving device 210, a limiting portion 220, and a limiting member 230. The fixing portion 110 is disposed on the first shell 910, and is provided with a fixing hole 111. One end 122 of the fixing member 120 is pivotally connected to an outer side of the second shell 920, and when the first shell 910 approaches the second shell 920, the fixing member 120 may rotate so that the other end 121 is inserted into the fixing hole 111 to be engaged with the fixing portion 110. The driving device 210 is disposed on the first shell 910, and the driving device 210 is preferably but not limited to be inserted to the first shell 910. The limiting portion 220 is disposed on an inner side of the first shell 910. The limiting member 230 is disposed on an inner side of the second shell 920, and one end of the limiting member 230 is provided with a limiting member end portion 231. The limiting member end portion 231 is preferably but not limited to be of a hook shape. When the first shell 910 approaches the second shell 920, the limiting member end portion 231 may be engaged with the limiting portion 220. The driving device 210 may be subjected to an external force to release the engagement between the fixing member 120 and the fixing portion 110 and the engagement between the limiting member end portion 231 and the limiting portion 220. The first shell 910 may approach the second shell 920 to form an approaching boundary 901 (referring to FIG. 2A), and the driving device 210 may be subjected to the external force to move along the approaching boundary 901.

Based on the above, when the other end 121 of the fixing member 120 accidentally leaves the fixing hole 111 due to vibration and other reasons, because the driving device 210 is not subjected to the external force which will release the engagement between the limiting member end portion 231 and the limiting portion 220, the limiting device 200 is able to limit and prevent the first shell 910 and the second shell 920 from moving away from each other, that is, prevent the box body from being opened accidentally. On the other hand, compared with the common suitcase, even if the box body 900 is loaded with more or bulky objects, after the first shell 910 approaches the second shell 920, the limiting member end portion 231 is engaged with the limiting portion 220, to limit and prevent the first shell 910 and the second shell 920 from moving away from each other, thereby maintaining an approached state. Therefore, a user may easily insert the other end 121 of the fixing member 120 into the fixing hole 111 to complete fixing of the box body 900.

Figure 3A:
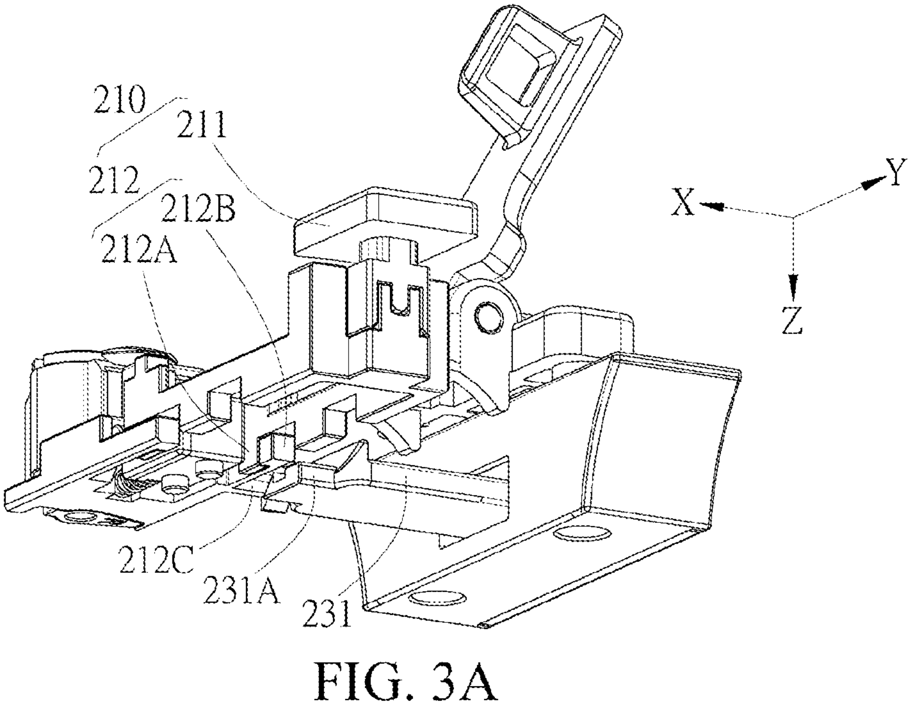
FIG. 3A is a schematic diagram of an embodiment of a driving device being located at a closed position in the opening and closing device of the present utility model.
Figure 3B:
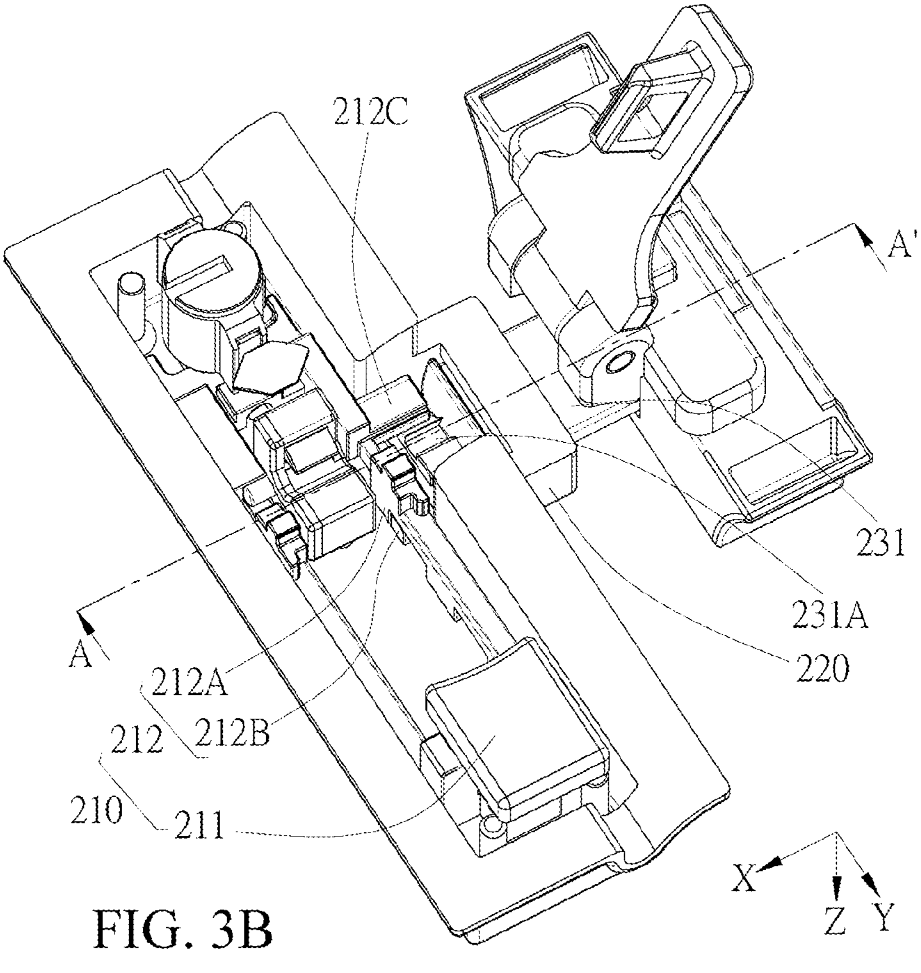
FIG. 3B is a schematic diagram of an embodiment of a limiting member end portion being engaged with a limiting portion in the opening and closing device of the present utility model.
Figure 3C:
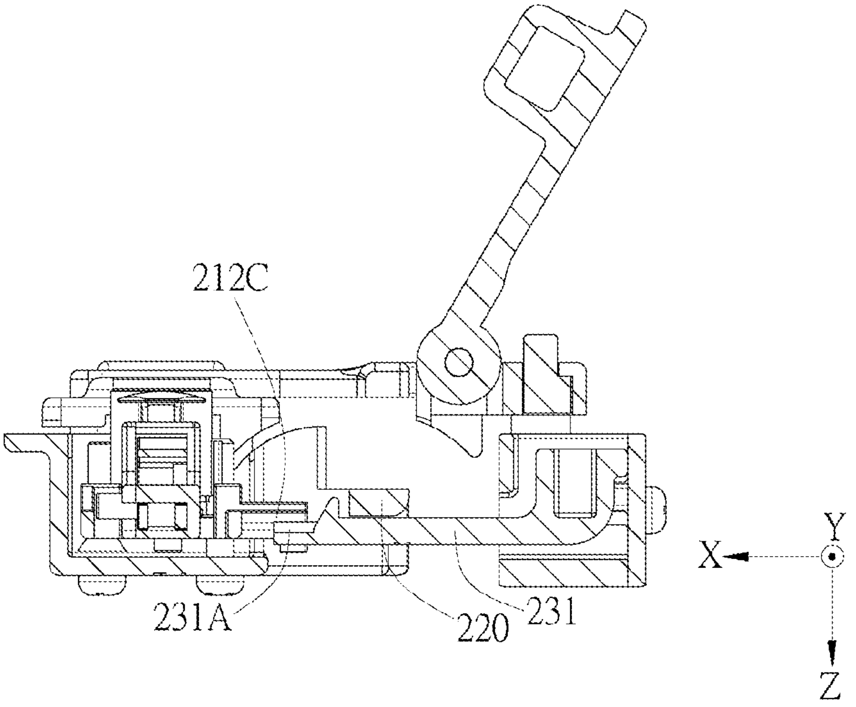
FIG. 3C is a schematic cross-sectional view of the embodiment of the limiting member end portion being engaged with the limiting portion in the opening and closing device of the present utility model.
Figure 3D:
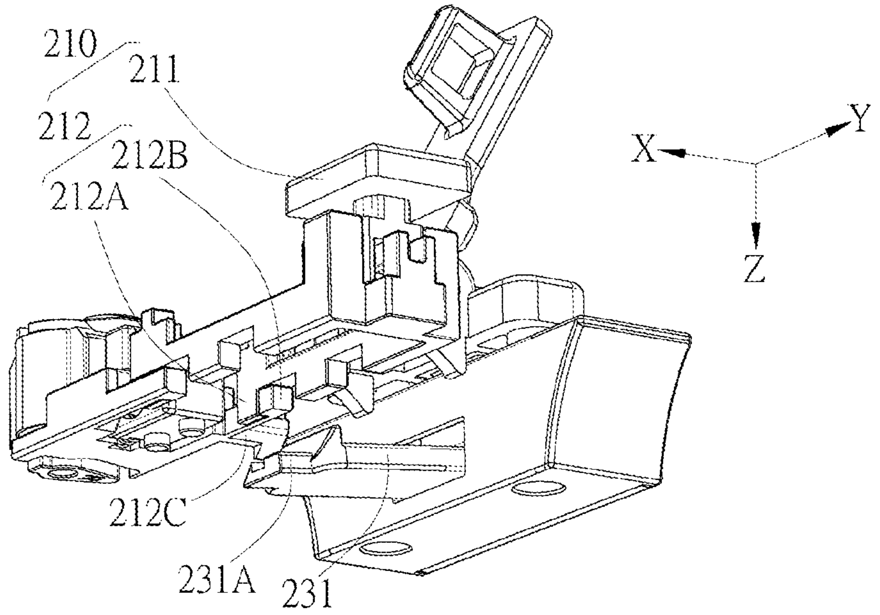
FIG. 3D is a schematic diagram of an embodiment of a driving device being located at an open position in the opening and closing device of the present utility model.
Figure 3E:
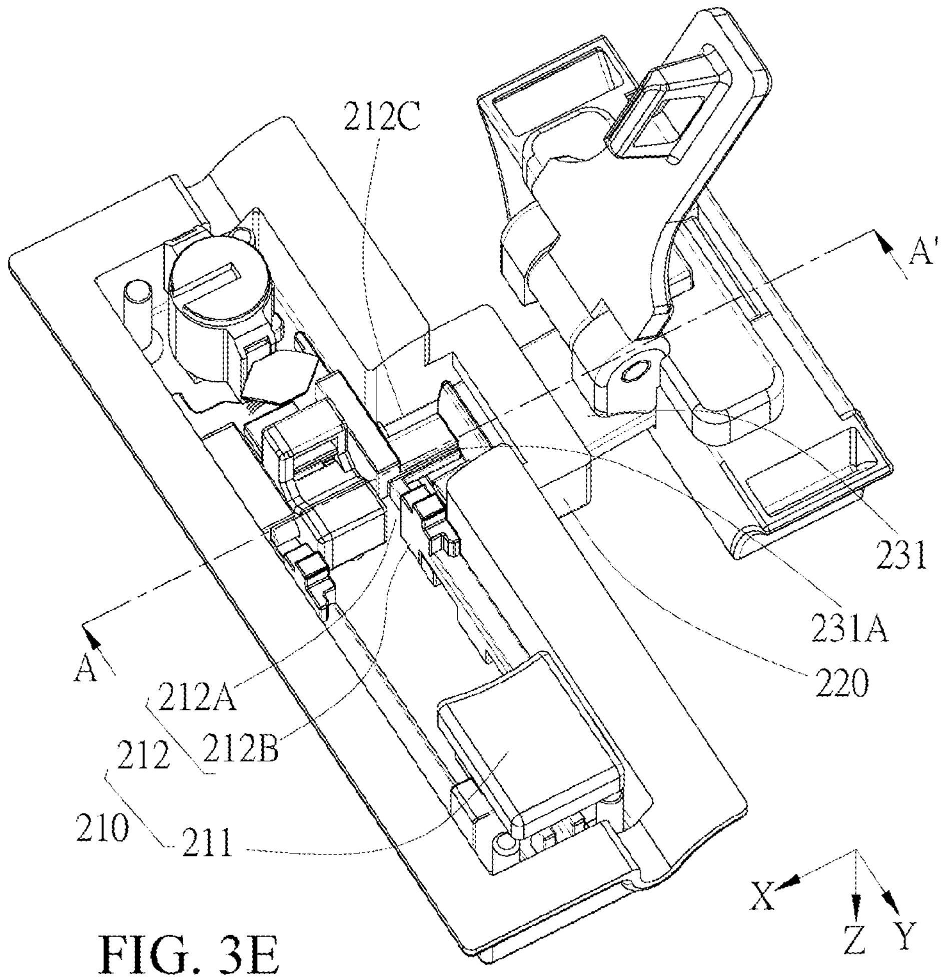
FIG. 3E is a schematic diagram of an embodiment of releasing the engagement between the limiting member end portion and the limiting portion in the opening and closing device of the present utility model.
Figure 3F:
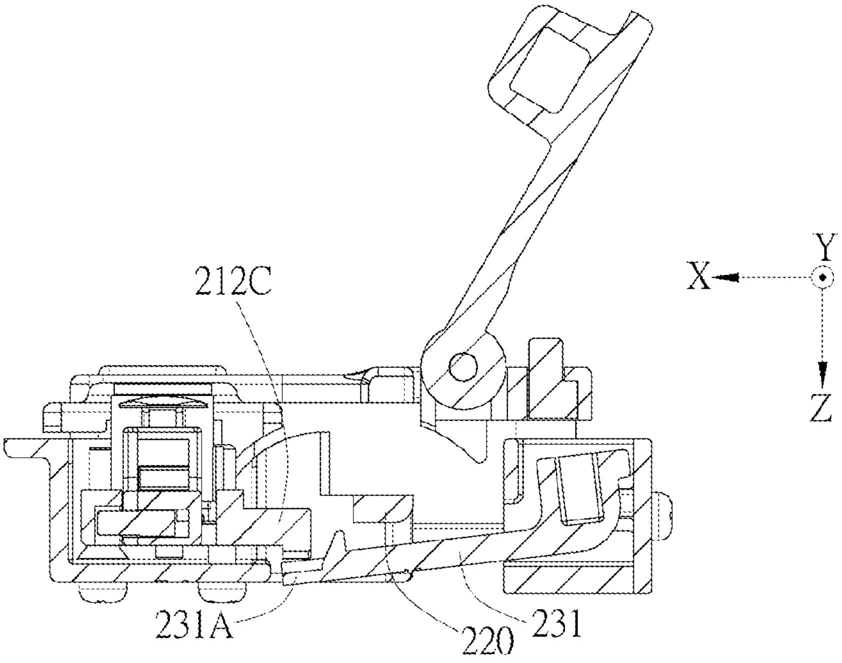
FIG. 3F is a schematic cross-sectional view of the embodiment of releasing the engagement between the limiting member end portion and the limiting portion in the opening and closing device of the present utility model.

More specifically, FIG. 3A and FIG. 3B are respectively a three-dimensional bottom view and a three-dimensional top view of an embodiment of the driving device 210 being located at a closed position in the present utility model, and FIG. 3C is equivalent to a cross-sectional view of a cut surface taken along a dash-dot line A-A' shown in FIG. 3B. FIG. 3D and FIG. 3E are respectively a three-dimensional bottom view and a three-dimensional top view of an embodiment of the driving device 210 being located at an open position in the present utility model, and FIG. 3F is equivalent to a cross-sectional view of a cut surface taken along a dash-dot line A-A' shown in FIG. 3E. To facilitate description and understanding, only some components are shown in the schematic diagrams of FIG. 3A to FIG. 3F.

In the embodiment shown in FIG. 3A and FIG. 3B, the driving device 210 includes a manual member 211 and a driving member 212. The manual member 211 is disposed on the outer side of the first shell 910 (referring to FIG. 2A). The driving member 212 is connected to the manual member 211, and is disposed on the inner side of the first shell 910. The limiting member end portion 231 extends toward the first shell 910 along an X axis. As shown in FIG. 3B and FIG. 3C, when the driving device 210 is located at the closed position, the limiting member end portion 231 is engaged with the limiting portion 220 through a hook-shaped end portion. In other words, in this case, the limiting portion 220 may limit the limiting member end portion 231 to move away along the X axis.

In the embodiment shown in FIG. 3D and FIG. 3E, the driving member 212 includes a first moving member 212A connected to the manual member 211 and a second moving member 212B abutting against the first moving member 212A, and the manual member 211 may be subjected to the external force so that the first moving member 212A moves to drive the second moving member 212B. A top end of the limiting member end portion 231 extends toward the first shell 910 (referring to FIG. 2B) along the X axis to form a driving portion 231A. As shown in FIG. 3D and FIG. 3E, the manual member 211 may be subjected to the external force so that the driving member 212 moves along a Y axis, so that a bump 212C of the driving member 212 abuts against the driving portion 231A. In this way, the limiting member end portion 231 may move from the position shown in FIG. 3A and FIG. 3C to the position shown in FIG. 3D and FIG. 3F, so that the limiting member end portion 231 generates displacement along a Z axis, to release the engagement between the limiting member end portion 231 and the limiting portion 220. In other words, in this case, the limiting member end portion 231 may move away from the limiting portion 220 along the X axis. The X axis, the Y axis, and the Z axis are orthogonal.

Figure 4A:
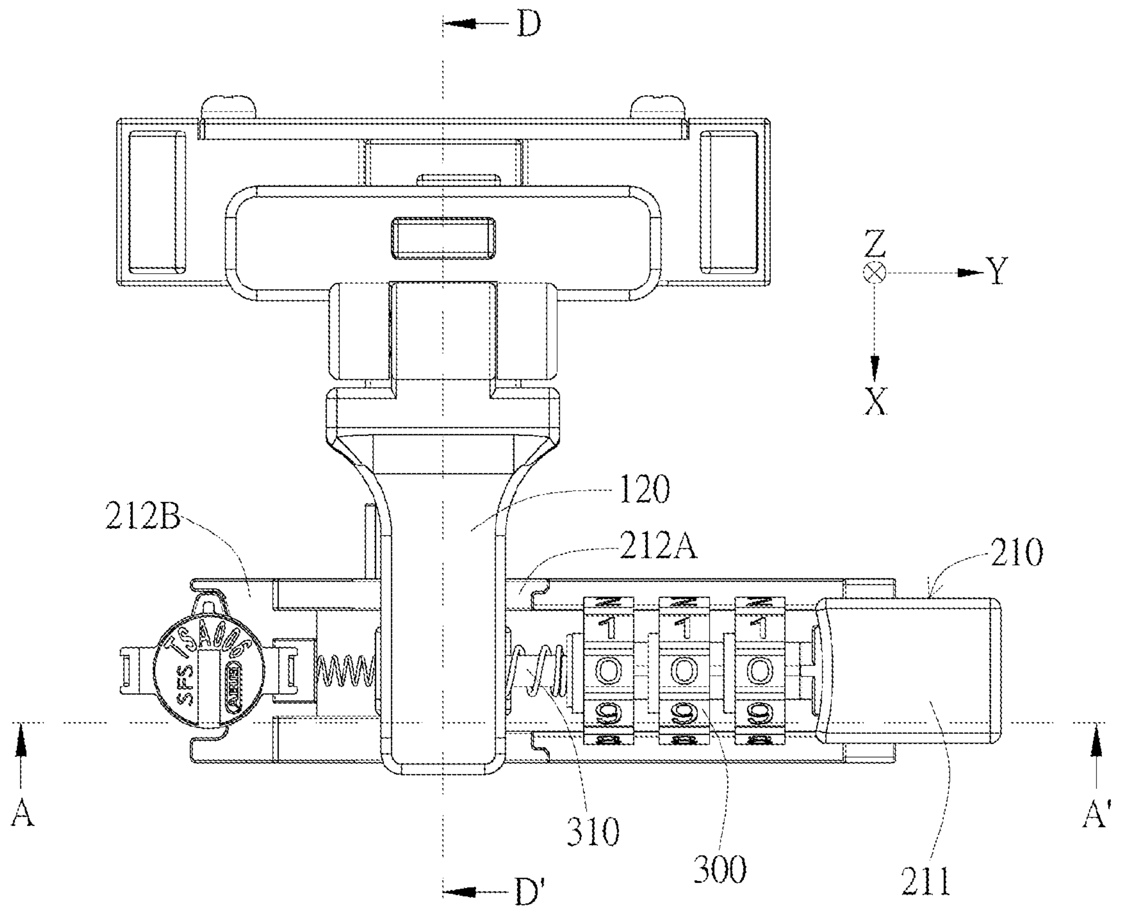
FIG. 4A is a schematic top view of another embodiment of the driving device being located at the closed position in the opening and closing device of the present utility model.
Figure 4B:
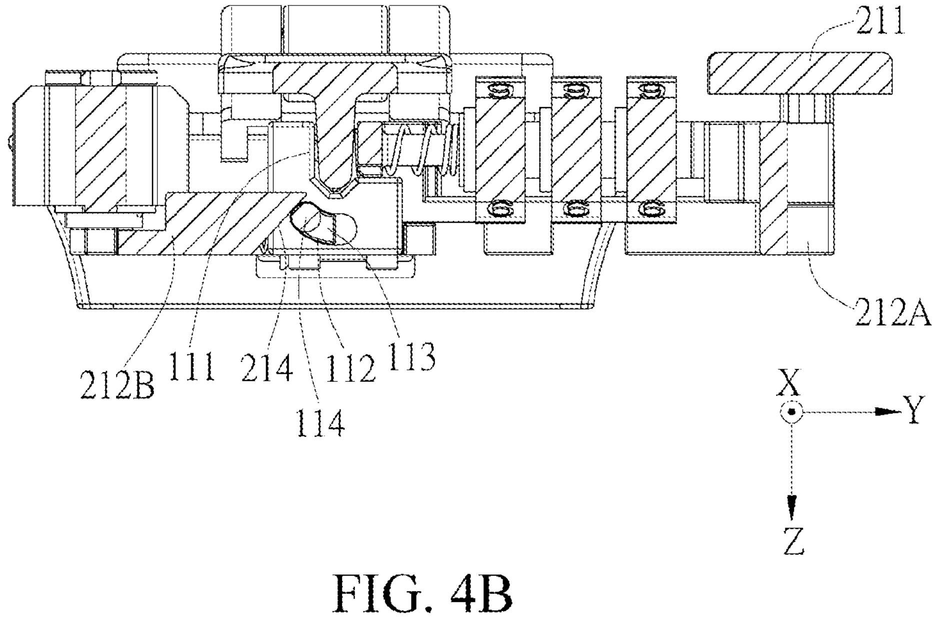
FIG. 4B and FIG. 4C are schematic cross-sectional views of another embodiment of the driving device being located at the closed position in the opening and closing device of the present utility model.
Figure 4C:
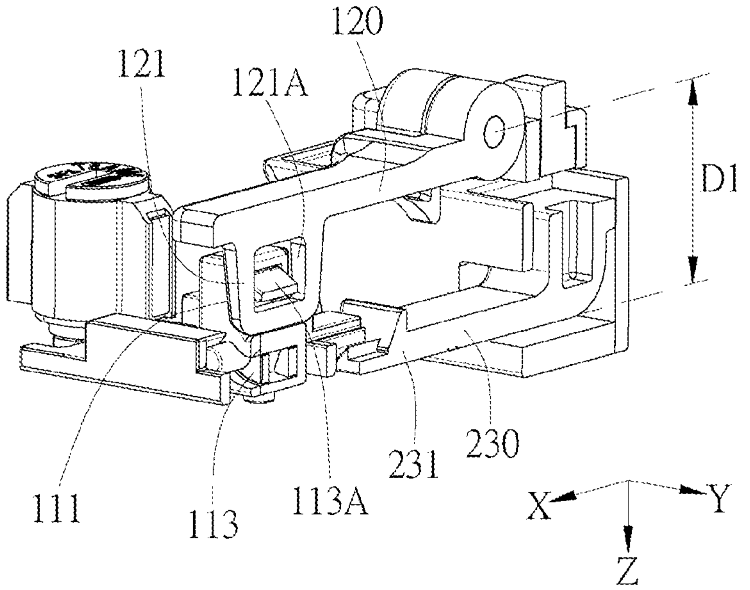
Figure 4D:
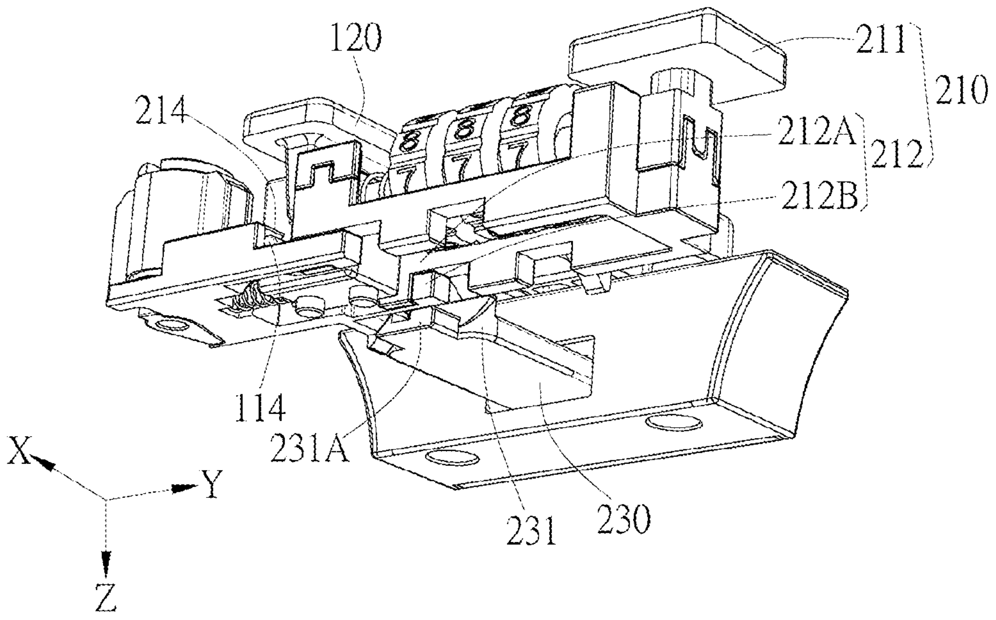
FIG. 4D is a schematic three-dimensional diagram of another embodiment of the driving device being located at the closed position in the opening and closing device of the present utility model.
Figure 5A:
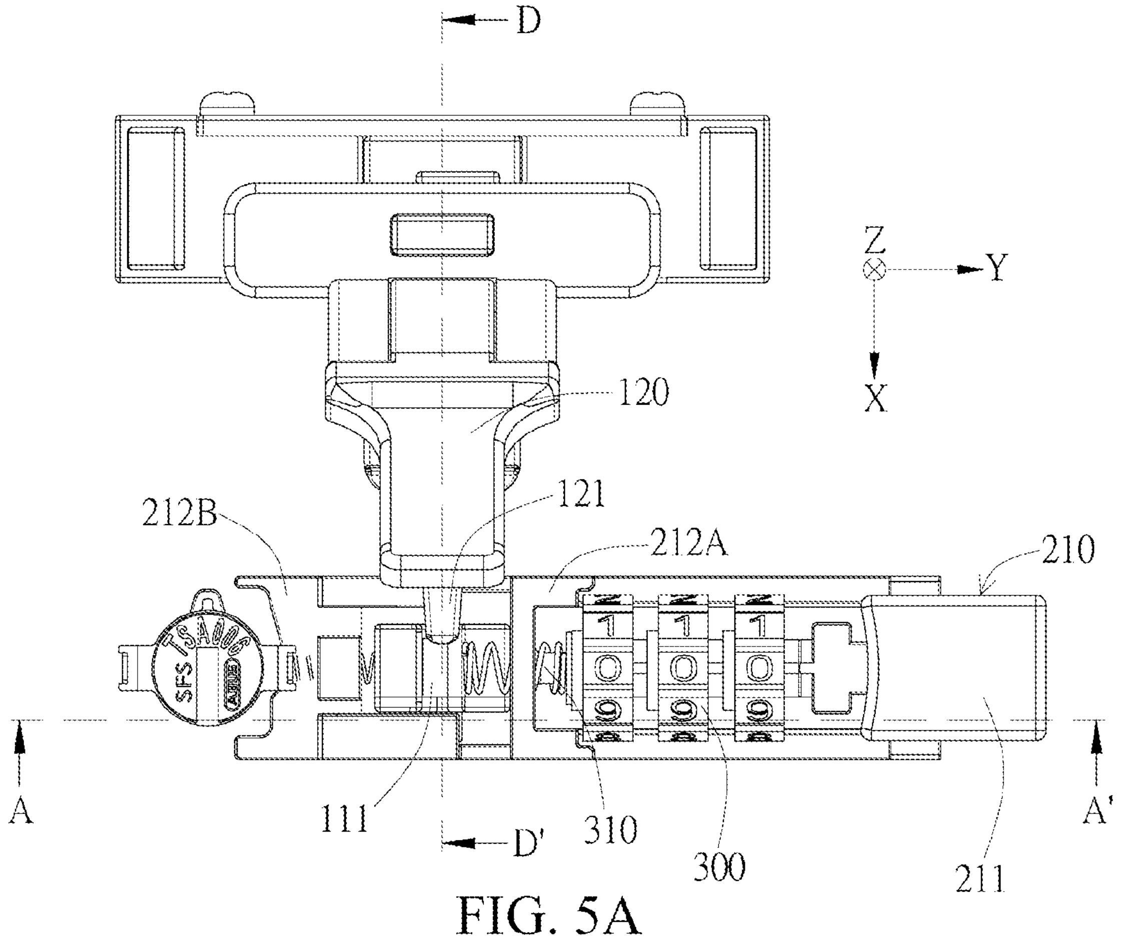
FIG. 5A is a schematic top view of another embodiment of the driving device being located at the open position in the opening and closing device of the present utility model.
Figure 5B:
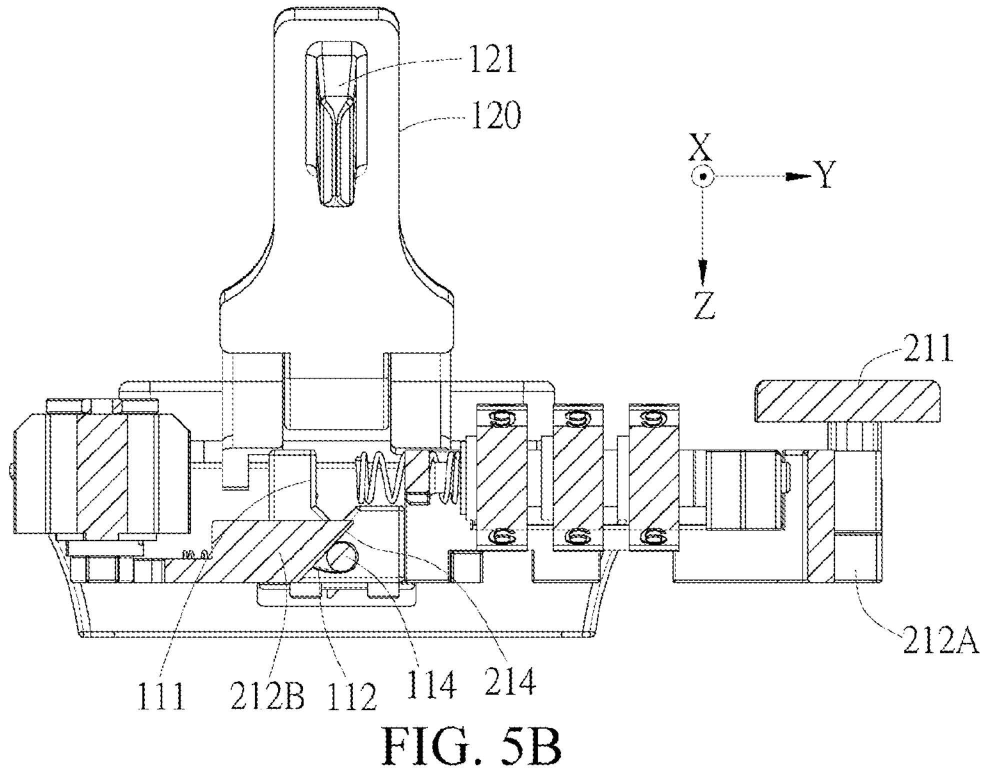
FIG. 5B and FIG. 5C are schematic cross-sectional views of another embodiment of the driving device being located at the open position in the opening and closing device of the present utility model.
Figure 5C:
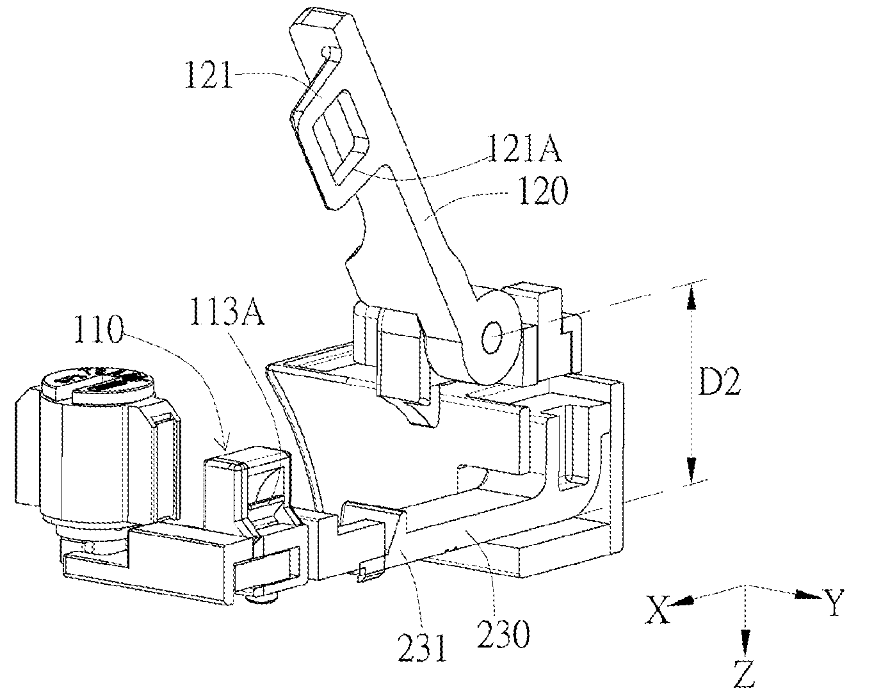
Figure 5D:
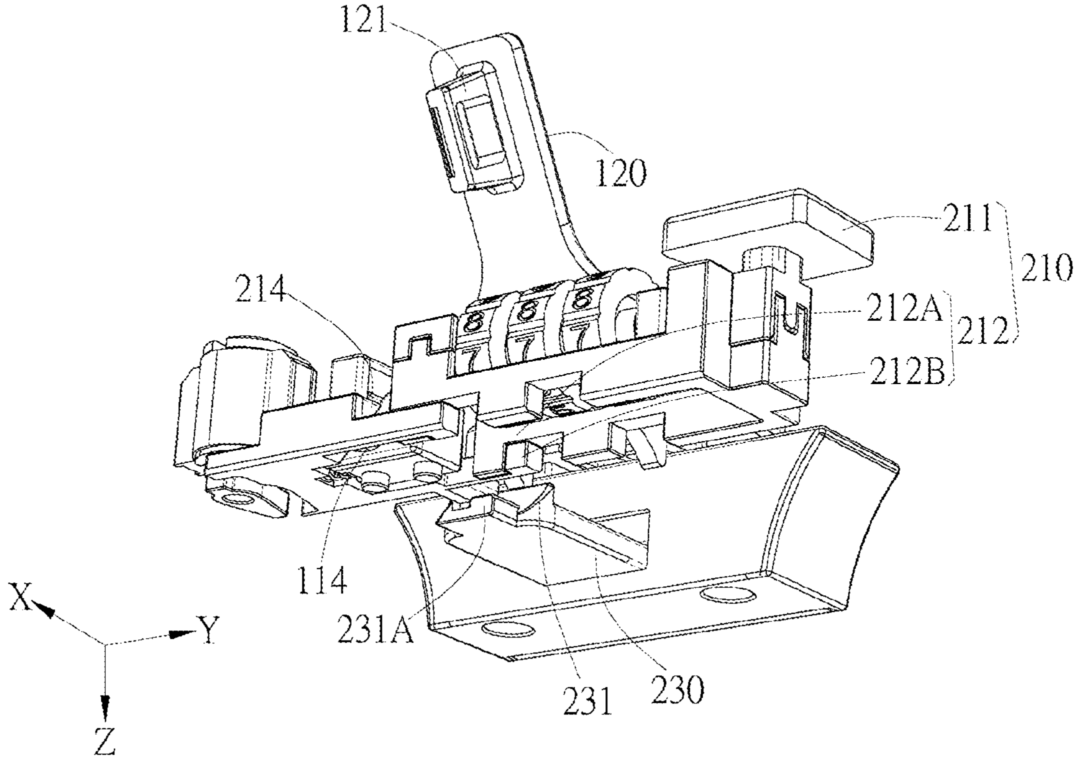
FIG. 5D is a schematic three-dimensional diagram of another embodiment of the driving device being located at the open position in the opening and closing device of the present utility model.

On the other hand, FIG. 4A is a top view of an embodiment of the driving device 210 being located at the closed position in the present utility model, FIG. 4B is equivalent to a cross-sectional view of a cut surface taken along a dash-dot line A-A' shown in FIG. 4A, FIG. 4C is equivalent to a cross-sectional view of a cut surface taken along a dash-dot line D-D' shown in FIG. 4A, and FIG. 4D is a three-dimensional view of this embodiment. FIG. 5A is a top view of an embodiment of the driving device 210 being located at the open position in the present utility model, FIG. 5B is equivalent to a cross-sectional view of a cut surface taken along a dash-dot line A-A' shown in FIG. 5A, FIG. 5C is equivalent to a cross-sectional view of a cut surface taken along a dash-dot line D-D' shown in FIG. 5A, and FIG. 5D is a three-dimensional view of this embodiment. To facilitate description and understanding, only some components are shown in the schematic diagrams of FIG. 4A to FIG. 5D.

In the embodiment shown in FIG. 4B to FIG. 4D, the fixing portion 110 further includes an arc-shaped guide slot 112 and an arc-shaped hook 113 that is movably disposed in the arc-shaped guide slot 112; and when the other end 121 of the fixing member 120 is inserted into the fixing hole 111, the arc-shaped hook 113 may move so that one end 113A of the arc-shaped hook 113 extends into the fixing hole 111 to be engaged with the other end 121 of the fixing member 120. The other end 121 of the fixing member 120 is preferably provided with a hole 121A for the one end 113A of the arc-shaped hook 113 to extend for engagement.

In the embodiment shown in FIG. 4D and FIG. 5D, the driving member 212 includes the first moving member 212A connected to the manual member 211 and the second moving member 212B abutting against the first moving member 212A, and the manual member 211 may be subjected to the external force so that the first moving member 212A moves to drive the second moving member 212B. A push block 114 is disposed on one side of the arc-shaped hook 113, and the second moving member 212B is provided with a guiding slope 214 corresponding to the push block 114. The manual member 211 may be subjected to the external force so that the driving member 212 moves along the Y axis, so that the guiding slope 214 abuts against the push block 114. In this way, the one end 113A of the arc-shaped hook 113 may move from the position of extending into the fixing hole 111 shown in FIG. 4C to be engaged with the hole 121A to the position of leaving the fixing hole 111 shown in FIG. 5C, to release the engagement between the one end 113A of the arc-shaped hook 113 and the other end 121 of the fixing member 120, that is, to release the engagement between the fixing portion 110 and the fixing member 120.

In the embodiments shown in FIG. 4A and FIG. 5A, the opening and closing device 800 may further include a lock body 300 disposed on the fixing portion 110, for limiting movement of the driving device 210. More specifically, the lock body 300 includes a shaft rod 310 linked with the first moving member 212A of the driving member 212. When the lock body 300 is in a locked state, movement of the shaft rod 310 is limited, and the first moving member 212A cannot move. Therefore, the second moving member 212B cannot be driven to abut against the push block 114 and the driving portion 231A. In this way, the opening and closing device 800 may have a lock attachment function. The lock body 300 may be a combination lock.

Figure 6A:
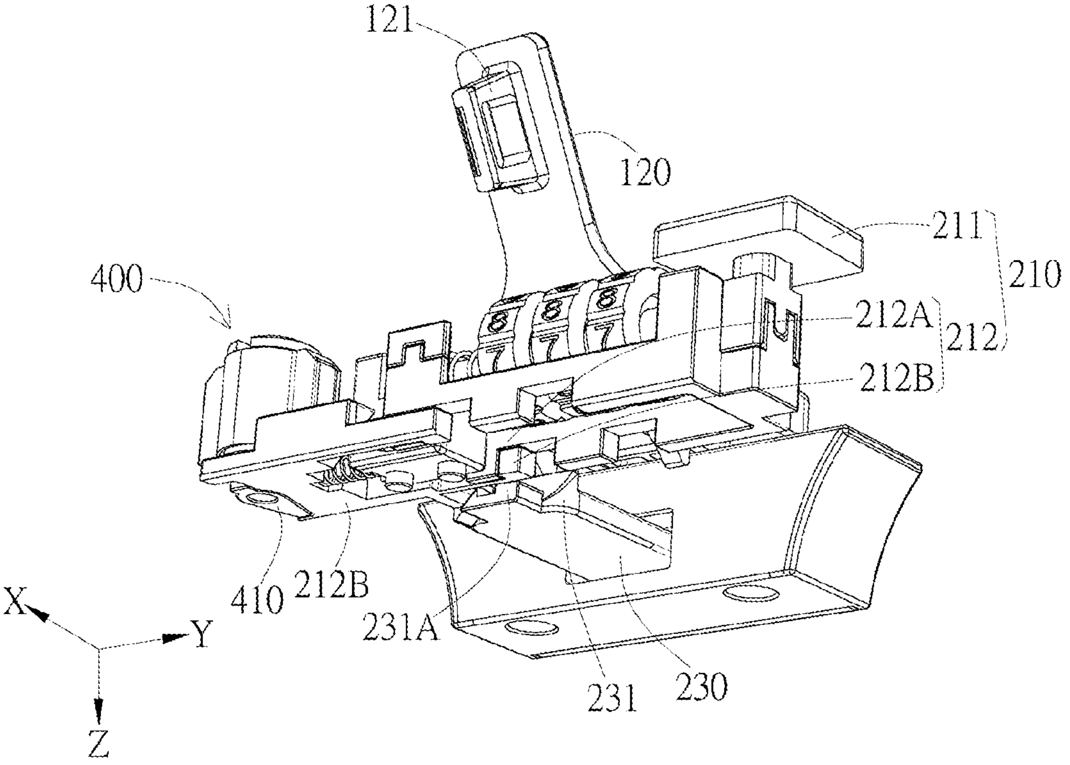
FIG. 6A and FIG. 6B are schematic diagrams of an embodiment of a release device in the opening and closing device of the present utility model.
Figure 6B:
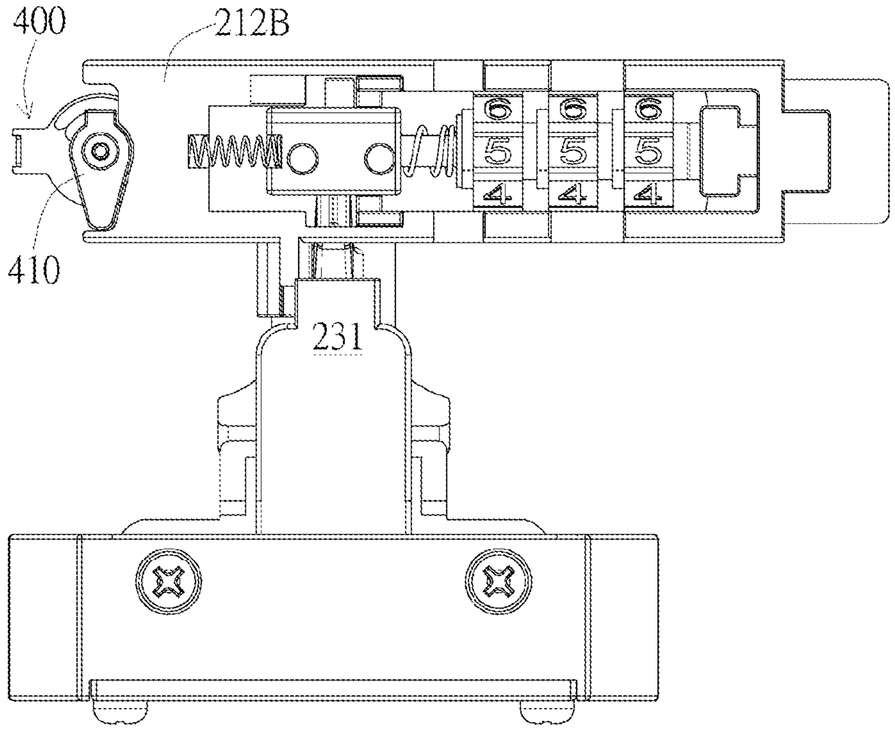
Figure 7A:
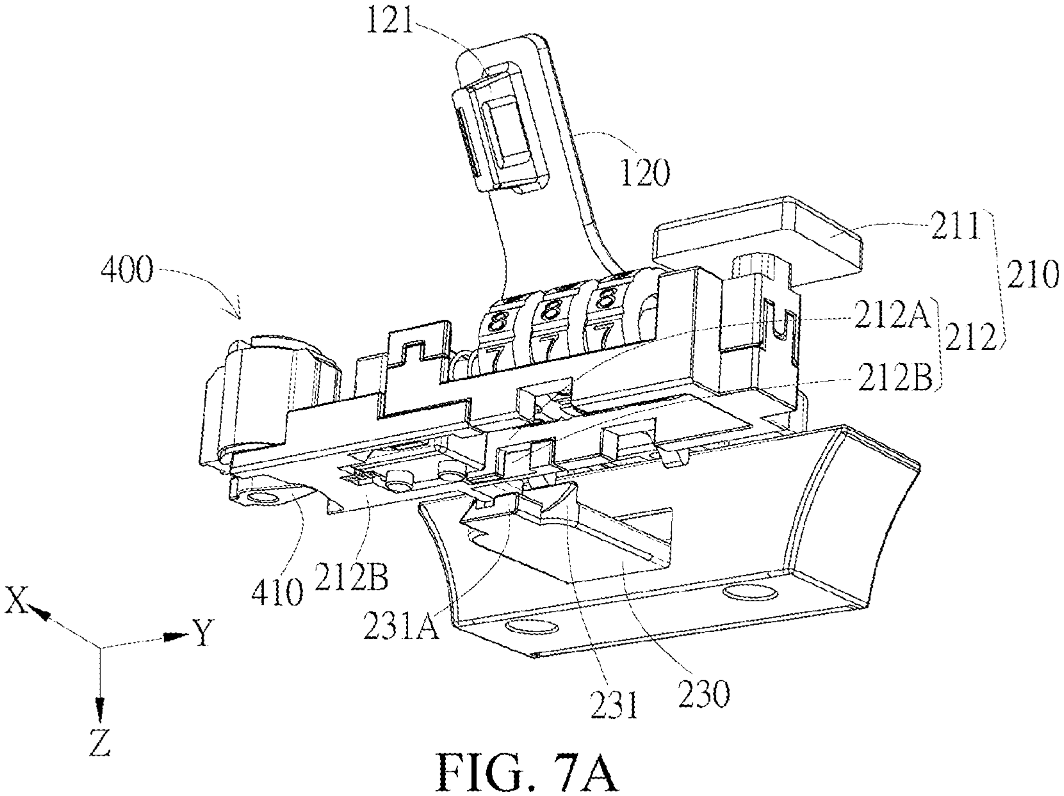
FIG. 7A and FIG. 7B are schematic diagrams of an embodiment of a rotating member of the release device rotating to push a second moving member in the opening and closing device of the present utility model.
Figure 7B:
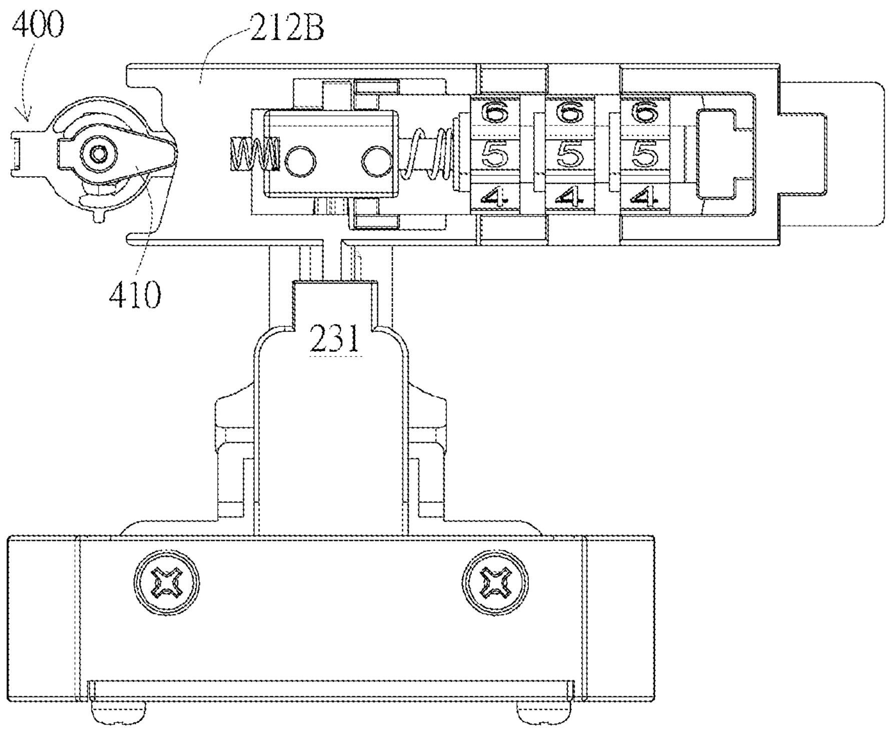

In a preferable embodiment, the opening and closing device 800 may further include a release device 400, to be conveniently opened by authorized personnel in situations such as baggage inspection at border customs. In an embodiment shown in FIG. 6A and FIG. 6B, the release device 400 is disposed on the first shell 910 (referring to FIG. 1A), for releasing the engagement between the fixing member 120 and the fixing portion 110 and the engagement between the limiting member end portion 231 (referring to FIG. 3C) and the limiting portion 220. More specifically, the release device 400 includes a rotating member 410. In an embodiment shown in FIG. 7A and FIG. 7B, the rotating member 410 may move to push the second moving member 212B, so that the second moving member 212B abuts against the push block 114 and the driving portion 231A, thereby releasing the engagement between the fixing member 120 and the fixing portion 110 and the engagement between the limiting member end portion 231 and the limiting portion 220. The release device 400 may be a key lock, and authorized personnel may unlock the lock with a special key and rotate the rotating member.

Although the foregoing description and drawings have disclosed exemplary embodiments of the present utility model, it should be understood that various additions, many modifications, and substitutions may be made thereto without departing from the spirit and scope of the principles of the present utility model as defined by the appended claims. Those ordinarily skilled in the art of the present utility model will appreciate that the present utility model is applicable to modifications of many forms, structures, arrangements, proportions, materials, elements, and components. Therefore, the embodiments disclosed herein should be considered as illustrative and not restrictive of the present utility model. The scope of the present utility model should be defined by the appended claims, and covers the legal equivalents thereof, but is not limited to the foregoing descriptions.

What is claimed is:

1. An opening and closing device for using with a first shell and a second shell that are approachable with each other, the opening and closing device comprising:

a fixing device, including:

a fixing portion, disposed on the first shell, and provided with a fixing hole;

a fixing member, wherein one end is pivotally connected to an outer side of the second shell, and when the first shell approaches the second shell, the fixing member rotates so that the other end is inserted into the fixing hole to be engaged with the fixing portion; and a limiting device, comprising:

a driving device, disposed on the first shell;

a limiting portion, disposed on an inner side of the first shell; and a limiting member, disposed on an inner side of the second shell, wherein one end of the limiting member is provided with a limiting member end portion, and when the first shell approaches the second shell, the limiting member end portion is engaged with the limiting portion, wherein the driving device is subjected to an external force to release the engagement between the fixing member and the fixing portion and the engagement between the limiting member end portion and the limiting portion.

2. The opening and closing device according to claim 1, further comprising a lock body for limiting movement of the driving device.

3. The opening and closing device according to claim 2, wherein the lock body is disposed on the fixing portion.

4. The opening and closing device according to claim 1, wherein the fixing portion further includes an arc-shaped guide slot and an arc-shaped hook that is movably disposed in the arc-shaped guide slot; when the other end of the fixing member is inserted into the fixing hole, the arc-shaped hook moves so that one end of the arc-shaped hook extends into the fixing hole to be engaged with the other end of the fixing member; and the driving device is push-able by the external force so that the arc-shaped hook moves and leaves the fixing hole, to release the engagement between the one end of the arc-shaped hook and the other end of the fixing member.

5. The opening and closing device according to claim 1, wherein the first shell approaches the second shell to form an approaching boundary, and the driving device is able to move along the approaching boundary by subjecting the external force to release the engagement between the limiting member end portion and the limiting portion.

6. The opening and closing device according to claim 1, wherein the driving device is inserted to the first shell, wherein the driving device includes:

a manual member disposed on the outer side of the first shell; and a driving member connected to the manual member, and disposed on the inner side of the first shell.

7. The opening and closing device according to claim 6, wherein the limiting member end portion extends toward the first shell along an X axis, and the manual member is subjected to the external force so that the driving member moves in a Y axis to abut against the limiting member end portion, so that the limiting member end portion generates displacement along a Z axis to release the engagement between the limiting member end portion and the limiting portion, wherein the X axis, the Y axis, and the Z axis are orthogonal.

8. The opening and closing device according to claim 7, wherein a top end of the limiting member end portion extends toward the first shell along the X axis to form a driving portion, and the manual member is subjected to the external force so that the driving member moves along the Y axis to abut against the driving portion.

9. The opening and closing device according to claim 6, further comprising a release device disposed on the first shell, for releasing the engagement between the fixing member and the fixing portion and the engagement between the limiting member end portion and the limiting portion.

10. The opening and closing device according to claim 9, wherein the driving member includes a first moving member connected to the manual member and a second moving member abutting against the first moving member, the manual member is subjected to the external force so that the first moving member moves to drive the second moving member, the release device includes a rotating member, and the rotating member rotates to push the second moving member.

* * * * *